United States Patent
Buttolo et al.

(10) Patent No.: US 10,295,250 B2
(45) Date of Patent: May 21, 2019

(54) VEHICLE-BASED SMART COOLER

(71) Applicant: Ford Global Technologies, LLC, Dearborn, MI (US)

(72) Inventors: Pietro Buttolo, Dearborn Heights, MI (US); Stuart C. Salter, White Lake, MI (US); James J. Surman, Clinton Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 86 days.

(21) Appl. No.: 15/231,547

(22) Filed: Aug. 8, 2016

(65) Prior Publication Data
US 2018/0038633 A1  Feb. 8, 2018

(51) Int. Cl.
| | |
|---|---|
| *B60H 1/00* | (2006.01) |
| *F25D 29/00* | (2006.01) |
| *B60L 1/00* | (2006.01) |
| *B60R 16/033* | (2006.01) |
| *F25D 11/00* | (2006.01) |
| *B60L 1/02* | (2006.01) |
| *B60L 3/00* | (2019.01) |

(Continued)

(52) U.S. Cl.
CPC ............. *F25D 29/003* (2013.01); *B60H 1/00* (2013.01); *B60L 1/003* (2013.01); *B60L 1/006* (2013.01); *B60L 1/02* (2013.01); *B60L 3/0023* (2013.01); *B60R 16/033* (2013.01); *F25D 11/003* (2013.01); *B60L 2240/36* (2013.01); *F25B 21/02* (2013.01); *F25B 2321/0212* (2013.01); *F25D 23/026* (2013.01); *F25D 2400/12* (2013.01); *F25D 2700/02* (2013.01); *F25D 2700/06* (2013.01); *F25D 2700/12* (2013.01); *F25D 2700/14* (2013.01); *F25D 2700/16* (2013.01); *Y02T 90/16* (2013.01)

(58) Field of Classification Search
CPC .......... B60L 1/003; B60L 1/02; B60L 3/0023; F25D 29/003; B60R 16/033; F25B 21/02
See application file for complete search history.

(56) References Cited

U.S. PATENT DOCUMENTS

| | | |
|---|---|---|
| 4,658,593 A | 4/1987 | Stenvinkel |
| 5,720,171 A | 2/1998 | Osterhoff et al. |

(Continued)

FOREIGN PATENT DOCUMENTS

| | | | |
|---|---|---|---|
| DE | 29824432 U | 5/2001 | |
| FR | 2816699 A1 * | 5/2002 | ........... B60H 1/3232 |

(Continued)

OTHER PUBLICATIONS

Search Report dated Jan. 24, 2018 for GB Patent Application No. GB 1712426.4 (3 pages).

*Primary Examiner* — Ana M Vazquez
(74) *Attorney, Agent, or Firm* — Frank Lollo; James P. Muraff; Neal, Gerber & Eisenberg LLP

(57) ABSTRACT

Example apparatus and methods are disclosed for a vehicle-based smart cooler. An example disclosed cooler includes an electric cooling unit, a plurality of sensors, a wireless node, and a cooling control unit. The example wireless node communicatively couples to the vehicle. The example cooling control unit monitors a charge margin of the vehicle and, in response to the charge margin being below a threshold, activates a power management technique.

12 Claims, 3 Drawing Sheets

(51) Int. Cl.
    *F25B 21/02*        (2006.01)
    *F25D 23/02*        (2006.01)

(56) References Cited

U.S. PATENT DOCUMENTS

| | | | | |
|---|---|---|---|---|
| 5,860,281 | A * | 1/1999 | Coffee | A45C 11/20 |
| | | | | 312/298 |
| 6,532,749 | B2 * | 3/2003 | Rudick | F25B 9/14 |
| | | | | 62/239 |
| 7,722,204 | B1 * | 5/2010 | Sandberg | F25D 27/005 |
| | | | | 362/155 |
| 9,144,026 | B2 | 9/2015 | Sanders et al. | |
| 2006/0067259 | A1 * | 3/2006 | Yousuf | H04L 12/4641 |
| | | | | 370/310 |
| 2009/0237258 | A1 | 9/2009 | Heck et al. | |
| 2010/0052353 | A1 | 3/2010 | Shea et al. | |
| 2011/0193710 | A1 | 8/2011 | McIlvain et al. | |
| 2012/0028680 | A1 | 2/2012 | Breed | |

FOREIGN PATENT DOCUMENTS

| | | | |
|---|---|---|---|
| JP | 2008260388 A | * | 10/2008 |
| SE | 1250246 A1 | | 9/2013 |

* cited by examiner

VEHICLE-BASED SMART COOLER

TECHNICAL FIELD

The present disclosure generally relates to portable coolers for vehicles and, more specifically, a vehicle-based smart cooler.

BACKGROUND

Getting items cold and keeping them cold requires a power draw that can deplete a vehicle battery. Even when the vehicle engine is running, power demand from the systems of the vehicle, such as an HVAC system, can demand more current draw than the alternator can supply. Traditionally, coolers either turn off when the ignition is off, providing no cooling even during short stops when cooling is desired; or cooler stay on when the ignition is off, which can deplete the vehicle battery during longer stops.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are disclosed for a vehicle-based smart cooler. An example disclosed cooler includes an electric cooling unit, a plurality of sensors, a wireless node, and a cooling control unit. The example wireless node communicatively couples to the vehicle. The example cooling control unit monitors a charge margin of the vehicle and, in response to the charge margin being below a threshold, activates a power management technique.

An example disclosed method to manage a portable cooler for a vehicle includes receiving, via a wireless node to communicatively coupled to the vehicle, charge margin and operational information from the vehicle. Additionally, the example method includes, in response to a level of the charge margin and the operational information, activating, with a processor, a power management technique of the portable cooler.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
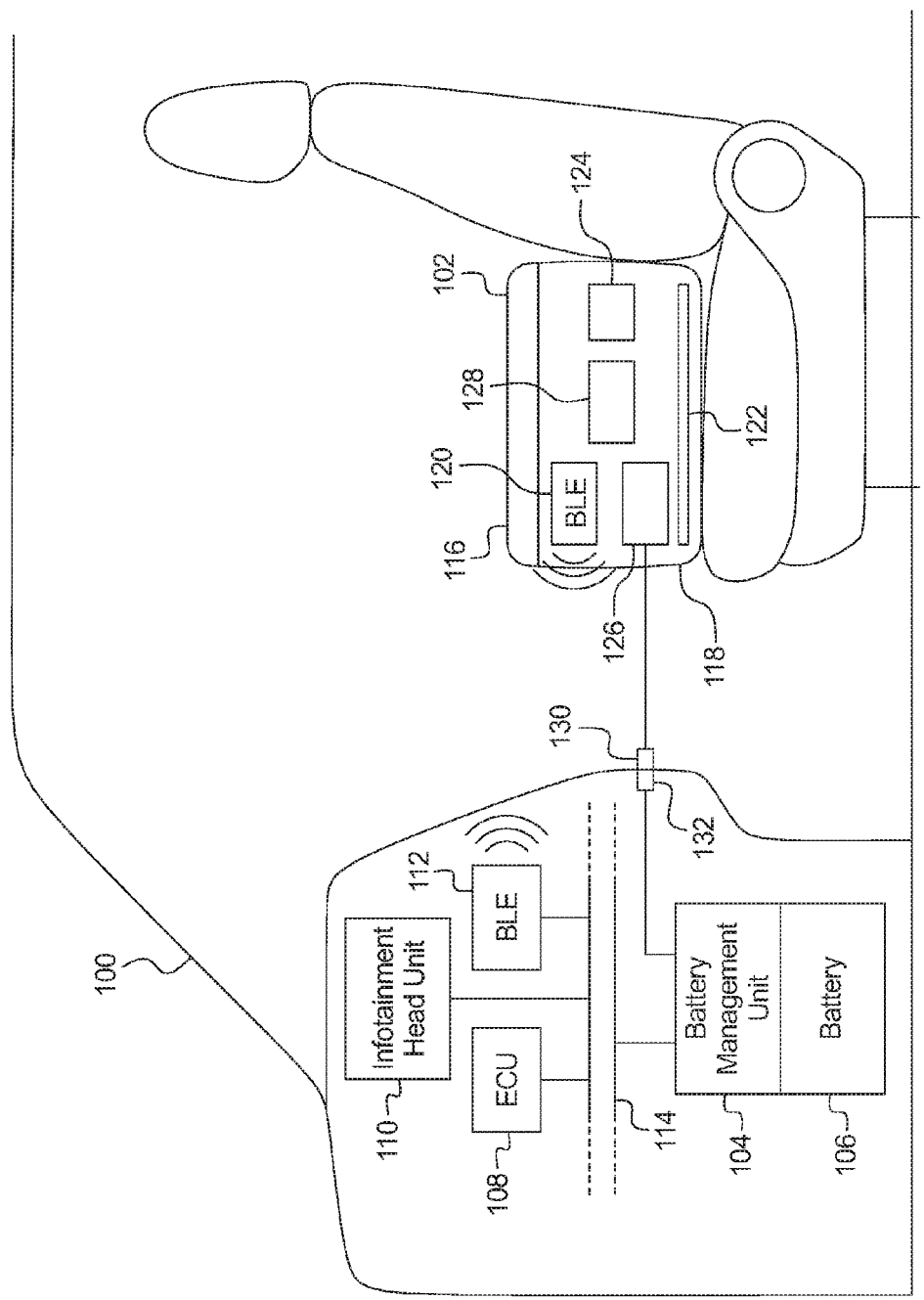
FIG. 1 is a system diagram of the vehicle and the cooler in accordance with the teachings of this disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

A vehicle power bus supplies current from the alternator and the battery to the subsystems of the vehicle. When the engine of the vehicle is running, the alternator supplies current in relation to the revolutions per minute (RPM) of the engine. When the alternator is supplying current, the voltage of the vehicle power bus is higher than the voltage of the battery (e.g., 12.6 volts (V)). For example, the voltage of the power bus may be between 13.8V and 14.2V. When current demand exceeds the current supplied by the alternator, the battery supplies additional current. In such a scenario, (a) the voltage of the power bus drops to the voltage of the battery (e.g., from 14.2V to 12.6V), (b) the battery is not being recharged, and (c) the vehicle battery discharges. In such a manner, the charge of the battery may discharge below a threshold voltage to supply enough current to start the vehicle (e.g., starter current). For example a nominally 12.6V vehicle battery may not be able to supplied starter current when the battery is below 12.1V. As used herein, depletion voltage is the voltage at which the battery cannot provide the starter current. As used herein, the charge margin of the battery is a difference between current power bus voltage of the vehicle and the depletion voltage of the battery.

As disclosed below, a cooler is (i) electrically coupled to the vehicle (e.g., via a power port in an infotainment head unit), and (ii) communicatively coupled to the vehicle via a wireless connection. The cooler receives power information from the vehicle and sends status information to the vehicle via the wireless connection. The cooler monitors the charge margin of the vehicle, the available alternator current, and/or the voltage of the power bus. The cooler activates one or more power management techniques when the charge margin is below a threshold value, the available alternator current is less than the current demand, and/or the voltage of the current bus is below a threshold voltage. Example power management techniques include (a) requesting the engine control unit increase the RPM of the engine, (b) cycling power to the cooler, and (c) notifying the user that the cooler will turn off and turning off the cooling portion of the cooler.

FIG. 1 is a system diagram of a vehicle 100 and a cooler 102 in accordance with the teachings of this disclosure. The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc. Additionally, the vehicle 100 may be non-autonomous, semi-autonomous or autonomous. In the illustrated example, the vehicle 100 includes a battery management unit 104, a battery 106, an engine control unit 108, an infotainment head unit 110, a wireless node 112, and a vehicle data bus 114.

The battery management unit 104 monitors the battery 106 and manages the recharging of the battery 106. The battery management unit 104 includes sensors, such as voltage sensors, current sensors, temperature sensors. The battery management unit 104 monitors voltages of the battery 106, the charge and discharge currents of the battery 106, the internal temperature of the battery 106 and the ambient temperature around the battery 106 (e.g., in the engine compartment of the vehicle 100). The battery management unit 104 may calculate a state of charge (SoC) value that estimates the amount of useful charge (e.g., from 0% to 100%) of the battery 106. The battery 106 is a rechargeable battery (e.g., a lead-acid battery, a lithium-ion battery, etc.) that supplies power to subsystems (e.g., a sound system, an HVAC system, lights, starter motor, etc.) of the vehicle 100 via a power bus. The battery 106 recharges with excess current from an alternator (not shown) (e.g., current that is not used by the other subsystems).

The engine control unit 108 controls subsystems related to engine performance, such as ignition, fuel injection, and spark plug timing, etc. Additionally, the engine control unit 108 controls the idle RPM of the engine. The idle RPM of the engine is associated with the amount of current produced by the alternator that is coupled the driveshaft of the engine. For example, at 500 RPM, the alternator may provide 20 amps (A) and at 1000 RPM, the alternator may provide 70 A.

The infotainment head unit 110 provides an interface between the vehicle 100 and a user (e.g., a driver, a passenger, etc.). The infotainment head unit 110 includes digital and/or analog interfaces (e.g., input devices and output devices) to receive input from the user(s) and display information. The input devices may include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, a heads-up display, a center console display (e.g., a liquid crystal display ("LCD"), an organic light emitting diode ("OLED") display, a flat panel display, a solid state display, etc.), and/or speakers. In some examples, the infotainment head unit 110 includes hardware (e.g., a processor or controller, memory, storage, etc.) and software (e.g., an operating system, etc.) for an infotainment system. Additionally, in some examples, the infotainment system includes an application that (a) receives and displays status information (e.g., internal temperature, ambient temperature, lid position, power management mode, etc.) received from the cooler 102, and/or (b) receives input of a temperature setting and sends the temperature setting to the cooler 102.

The wireless node 112 includes hardware (e.g., processors, memory, storage, antenna, etc.) and software to communicate over wireless network interfaces. The wireless node 112 may include controllers to communicate over one or more local area wireless networks (e.g. IEEE 802.11 a/b/g/n/ac/p or others) and/or one or more personal area networks (e.g., Near Field Communication (NFC), Bluetooth®, Bluetooth® Low Energy (BLE) etc.). The BLE protocol is set forth in Volume 6 of the Bluetooth Specification 4.0 (and subsequent revisions) maintained by the Bluetooth Special Interest Group.

The vehicle data bus 114 communicatively couples the battery management unit 104, the engine control unit 108, the infotainment head unit 110, and the wireless node 112. In some examples, the vehicle data bus 114 includes one or more data buses. The vehicle data bus 114 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7), a K-line bus protocol (ISO 9141 and ISO 14230-1), and/or an Ethernet™ bus protocol IEEE 802.3 (2002 onwards), etc.

In the illustrated example, the cooler 102 includes an insulated lid 116 and an insulated body 118. The insulated body 118 forms a cavity to place items to be cooled. When the insulated lid 116 is shut, a gasket (not shown) forms a seal to prevent cool air inside the cooler 102 being displaced by warmer air outside of the cooler 102. The example cooler 102 also includes a wireless node 120, a cooling unit 122, sensors 124, a power module 126, and a cooling control unit 128.

The wireless node 120 is configured to communicatively couple to the wireless node 112 of the vehicle 100. The wireless node 120 includes hardware (e.g., processors, memory, storage, antenna, etc.) and software to communicate over wireless network interfaces. The wireless node 112 may include controllers to communicate over one or more local area wireless networks (e.g. IEEE 802.11 a/b/g/n/ac/p or others) and/or one or more personal area networks (e.g., Near Field Communication (NFC), Bluetooth®, Bluetooth® Low Energy (BLE) etc.).

The cooling unit 122 cools the interior of the cooler 102. In some examples, the cooling unit 122 is a Peltier heat pump (sometimes referred to as a "thermoelectric cooler"). In such examples, the cooling unit 122 draws current based on the difference between the target temperature the interior of the cooler 102 and the ambient temperature around the exterior of the cooler. For example, the cooling unit 122 may draw 0 A to 8 A.

The sensors 124 are positioned to monitor the status of the cooler 102. The example cooler 102 includes internal temperature sensor(s) (e.g., thermistor(s), etc.), a lid position sensor (e.g., a mechanical switch, an infrared switch, etc.), a content temperature sensor (e.g., an infrared temperature sensor, etc.), an object presence sensor (an infrared sensor, an ultrasonic sensor, a capacitive sensor, etc.) and an ambient temperature sensor (e.g., a thermistor, etc.). The sensors 124 are communicatively coupled to the cooling control unit 128.

The power module 126 electrically couples to the power bus of the vehicle 100 when a plug 130 of the cooler 102 is plugged into a power socket 132 of the vehicle 100. The power module 126 includes a voltage regulator to control power from the vehicle 100. Additionally, the power module 126 is communicatively coupled to the cooling control unit 128 to facilitate the cooling control unit 128 controlling the power to the cooling unit 122.

The cooling control unit 128 monitors the status of the cooler 102 and employs power management techniques based on operation information from the vehicle. The operation information from the vehicle includes (a) the charge margin and state of charge of the battery 106, (b) the cabin temperature of the vehicle 100, (c) a location of the cooler (e.g., based on a signal strength between the wireless node 112 of the vehicle 100 and the wireless node 120 of the cooler 102 and/or which power socket 132 the plug 130 of the cooler 102 is plugged into, etc.), (d) the time of day, (e) a time to destination (e.g., from a navigation system executing on the infotainment system), (f) the occupancy status (e.g., occupied, unoccupied,) of the vehicle 100 (e.g., from interior object detection sensors), and/or (g) the engine state (e.g., on, off, etc.). The cooling control unit 128 is communicatively coupled to wireless node 120, the sensors 124, and the power module 126.

When (i) the charge margin of the battery 106 satisfies (e.g., is less than) a voltage threshold, (ii) the current demand of the cooler 102 exceeds the supply of current from the alternator and/or (iii) the voltage of the power bus of the vehicle 100 approaches voltage of the battery 106, the cooling control unit 128 employs power management techniques. If the engine of the vehicle 100 is running, The cooling control unit 128 requests, via the wireless node 120, the engine control unit 108, if able, to increase the RPM of the engine to increase the current supplied by the alternator. If the engine is not running or the engine control unit 108 is unable to increase the RPM of the engine, the cooling control unit 128 cycles power to the cooling unit 122. For example, the cooling control unit 128 may cycle the cooling unit 122 on for a minute and off for five minutes. If the internal temperature of the cooler 102 satisfies (e.g., is less than) a threshold temperature below a set temperature, the cooling control unit 128, via the wireless node 120, broadcasts an alert. Additionally, if during the power cycling, the charge margin drops below a second charge threshold, the cooling control unit 128 deactivates the cooling unit 122 and broadcasts an alert.

In some examples, the cooling control unit 128 determines whether power is available to meet a temperature set based on the current draw to reach the set point and the current available from the vehicle 100. In some such examples, if power is not available, the cooling control unit 128 requests an increase to the RPM of the engine. In some examples, after a set time (e.g., one minute, two minutes, etc.) has elapsed since requesting the RPM increase and the charge margin continues to decrease, the cooling control unit 128 suggests, via the application executing on the infotainment system, an intervention (e.g., turning down the blower speed of the HVAC system, turning off cooled seats, etc.) by an occupant of the vehicle 100. In some examples, the cooling control unit 128 determines, via the object presence sensor, when cooler 102 is empty for a set period of time (e.g., two minutes, five minutes, etc.). In some such examples, if the cooler 102 is empty, the cooling control unit 128 deactivates the cooling unit 122.

In some examples, from time to time, the cooling control unit 128 determines a temperature difference between (i) the cabin temperature and (ii) the set temperature for the cooler 102, and determines if the set temperature is achievable. For example, a single-stage thermoelectric cooler can typically achieve a temperature difference of 40° F. If the cooling control unit 128 determines the set temperature is not achievable, the cooling control unit 128 notifies, via the infotainment system, occupants of the vehicle. For example, if the ambient temperature of the cabin of the vehicle 100 is 90° F. and the set temperature is 45° F., the cooling control unit 128 may send the notification. Additionally, in some examples, when, in response to an increase in the cabin temperature, the cooling control unit 128 increases the power to the cooling unit 122 to maintain the temperature setting, the cooling control unit 128 sends a notification to the vehicle 100. In some such examples, when, in response to an increase in the cabin temperature, the cooling control unit 128 increases the power to the cooling unit 122 to maintain the temperature setting, the cooling control unit 128 recommends to a location to move cooler 102. For example, the cooling control unit 128 may recommend moving the cooler 102 from a trunk to second row seat in the vehicle 100.

In some examples, the cooling control unit 128, via the infotainment system, provides a graphical depiction of the current and previous (i) actual internal temperature of the cooler 102, (ii) set temperature, and (iii) ambient temperature around the cooler 102. In some examples, the cooling control unit 128, via the content temperature sensor, determines whether temperature of the contents of the cooler 102 is outside a safe temperature range (e.g., 40° F.) for period of time. For example, the U.S. Food and Drug Administration recommends discarding any perishable food (such as meat, poultry, fish, eggs or leftovers) that has been above 40° F. for two hours or more, and frozen food is safe for refreezing if the contents are above 0° F. but stay below 40° F. If the temperature of the contents of the cooler 102 is outside the safe temperature range for the period of time, the cooling control unit 128 sends a notification to the vehicle 100. Additionally, in some examples, when employing the power management techniques discussed above, the cooling control unit 128 may, from time to time, predict when the contents of the cooler 102 will outside the safe temperature range for the period of time and sends a notification with the prediction to the vehicle 100. In some examples, the cooling control unit 128 predicts whether the temperature setting will be met when the vehicle 100 reaches its destination. In such examples, the cooling control unit 128 calculates a time to cool the contents of the cooler 102 based on (a) a starting temperature of objects in the cooler 102, and (b) a change in the temperature of the objects in the cooler 102 over a period of time (e.g., five minutes, etc.) For examples, filling the cooler 102 with a large heat mass, such as numerous cans of warm soda, may take some time to cool.

Figure 2:
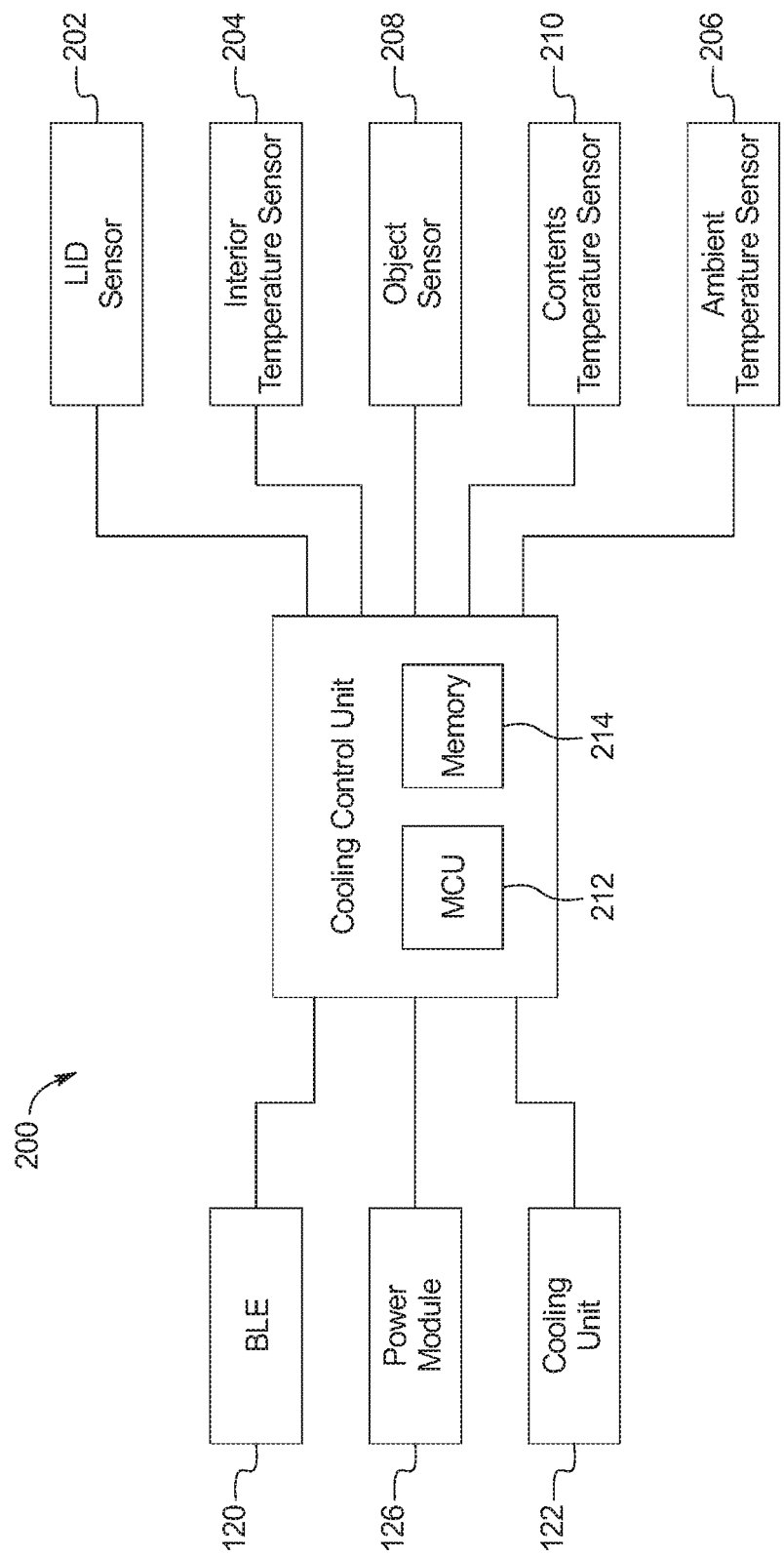
FIG. 2 is a block diagram of the electronic components of the cooler of FIG. 1.

FIG. 2 is a block diagram of the electronic components 200 of the cooler 102 of FIG. 1. In the illustrated example, the cooler 102 includes the wireless node 120, the cooling unit 122, the sensors 124, the power module 126, and the cooling control unit 128. The sensors 124 include a lid sensor 202, an interior temperature sensor 204, an ambient temperature sensor 206, an object sensor 208, and a content temperature sensor 210. The lid sensor 202 is a mechanical switch (e.g., a push-button switch) or an electrical switch (e.g., an infrared switch, a capacitive switch, etc.) that detected the state (e.g., open, closed, etc.) of the lid 116 of the cooler 102. The interior temperature sensor 204 is a thermistor that measures the temperature of the internal air of the cooler 102. The ambient temperature sensor 206 is a thermistor that measures the temperature of the air external to the cooler 102. The object sensor 208 detects whether one or more objects are inside the cooler 102. In some examples, the object sensor 208 is an ultrasonic sensor or an infrared sensor. The content temperature sensor 210 measures the surface temperature of the objects inside the cooler 102. In some examples, the content temperature sensor 210 is an infrared thermometer, or a probe placed on the surface of one of the objects.

The cooling control unit 128 includes a controller or processor 212 and memory 214. The processor or controller 212 may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). The memory 214 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 214 includes multiple kinds of memory, particularly volatile memory and non-volatile memory.

The memory 214 is computer readable media on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory 214, the computer readable medium, and/or within the processor 212 during execution of the instructions.

The terms "non-transitory computer-readable medium" and "computer-readable medium" should be understood to include a single medium or multiple media, such as a centralized or distributed database, and/or associated caches and servers that store one or more sets of instructions. The terms "non-transitory computer-readable medium" and "computer-readable medium" also include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

Figure 3:
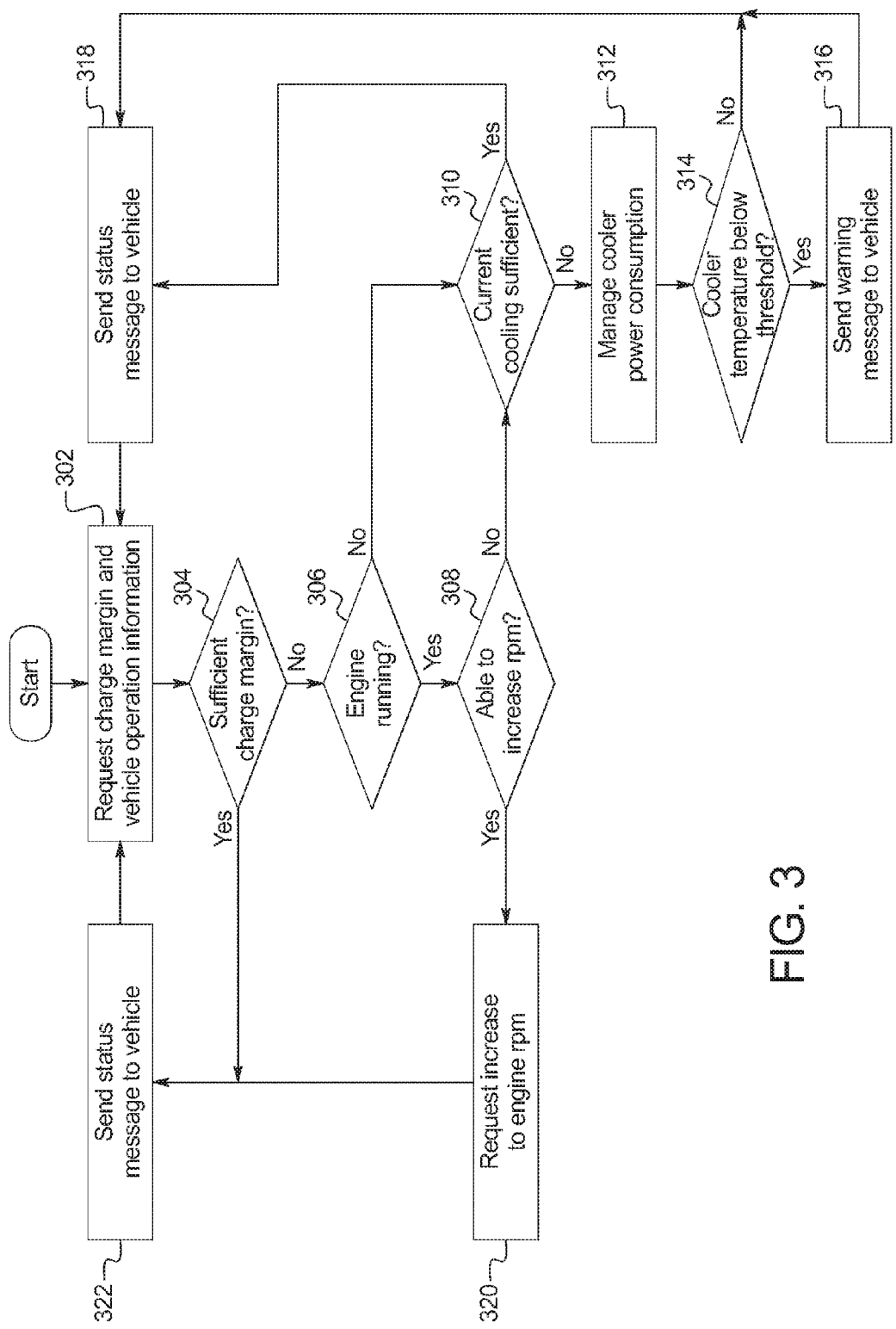
FIG. 3 is a flowchart of a method to manage the power draw of the cooler of FIG. 1 based on wireless signals received from the vehicle of FIG. 1.

FIG. 3 is a flowchart of a method to manage the power draw of the cooler 102 of FIG. 1 based on wireless signals received from the vehicle 100 of FIG. 1. The method illustrated in FIG. 3 may be implemented by the electronic components 200 of FIG. 2. Initially, at block 302, the cooling control unit 128 requests, via the wireless node 120, the charge margin and the vehicle operation information from the vehicle 100. At block 304, the cooling control unit 128 determines whether the charge margin received at block 302 satisfies (e.g., is greater than) a threshold. For example, the threshold may be 60% of the peak charge margin. If the charge margin satisfies the threshold, the method continues at block 322. Otherwise, if the charge margin does not satisfy the threshold, the method continues at block 306.

At block 306, the cooling control unit 128 determines, based on the vehicle operation information, whether the engine of the vehicle 100 is running. If the engine is running, the method continues to block 308. Otherwise, if the engine is not running, the method continues at block 310. At block 308, the cooling control unit 128 determines, based on the vehicle operation information, whether the engine control unit 108 of the vehicle 100 is able to increase the RPM of the engine. In some examples, the cooling control unit 128 includes a maximum RPM value at which it will not request the RPM of the engine to be increased. If the engine control unit 108 is able to increase the RPM of the engine, the method continues to block 320. Otherwise, if engine control unit 108 is not able to increase the RPM of the engine, the method continues to block 310.

At block 310, the cooling control unit 128 determines, based on the interior temperature sensor 204 and/or the content temperature sensor 210, whether the current cooling is sufficient. The current cooling is sufficient, for example, if (a) the cooler is substantially close to the temperature set point of the cooler 102 and/or (b) the temperature of the contents of the cooler 102 is not outside the safe temperature range for the recommended period of time. If the current cooling is sufficient, the method continues at block 318. Otherwise if the current cooling is not sufficient, the method continues to block 312. At block 312, the cooling control unit 128 manages the power consumption of the cooler 102. For example, the cooling control unit 128 power cycles the cooling unit 122 to be on for a minute and off for five minutes. At block 314, the cooling control unit 128 determines whether the internal temperature of the cooler 102 satisfies a threshold. The threshold may be set at a safety temperature (e.g., 40° F.) or a margin above the set temperature (e.g., 10° F. above). If the internal temperature of the cooler 102 satisfies a threshold, the method continues at block 318. Otherwise, if the internal temperature of the cooler 102 does not satisfy a threshold, the method continues at block 316. At block 316, the cooling control unit 128 sends, via the wireless node 120, a warning message to the vehicle 100. At block 318, the cooling control unit 128 sends, via the wireless node 120, a status message to the vehicle 100. The status message includes the internal temperature of the cooler 102, the ambient temperature around the cooler 102, and/or the temperature of the contents of the cooler 102.

At block 320, the cooling control unit 128 sends, via the wireless node 120, a request to increase the RPM of the engine to the vehicle 100. In some examples, the cooling control unit 128 requests to increase the RPM of the engine by a fixed amount (e.g., 100 RPM, 500 RPM, etc.). At block 322, the cooling control unit 128 sends, via the wireless node 120, a status message to the vehicle 100.

The flowchart of FIG. 3 is a method that may be implemented by machine readable instructions that comprise one or more programs that, when executed by a processor (such as the processor 212 of FIG. 2), cause the cooler 102 to implement the cooling control unit 128 of FIGS. 1 and 2. Further, although the example program(s) is/are described with reference to the flowchart illustrated in FIG. 3, many other methods of implementing the example the cooling control unit 128 may alternatively be used. For example, the order of execution of the blocks may be changed, and/or some of the blocks described may be changed, eliminated, or combined.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A cooler for a vehicle comprising:
an electric cooling unit;
a plurality of sensors;
a wireless node to communicatively couple to the vehicle; and
a cooling control unit to:
monitor a charge margin of the vehicle, the charge margin being a difference between a current power bus voltage of the vehicle and voltage at which a battery of the vehicle cannot provide a starter current; and in response to the charge margin being below a threshold, activate a power management technique.

2. The cooler of claim 1, wherein the electric cooling unit includes a thermoelectric cooler.

3. The cooler of claim 1, wherein the plurality of sensors includes an internal temperature sensor to measure a first temperature of an interior of the cooler, and an ambient temperature sensor to measure an ambient temperature around the cooler.

4. The cooler of claim 3, wherein the plurality of sensors includes a lid sensor to detect a position of a lid of the cooler, a contents temperature sensor to measure a second temperature of an item in cooler, and contents sensor to detect when the item is in the cooler.

5. The cooler of claim 3, wherein the electric cooling unit is to draw a first current from the vehicle based on a difference between a target temperature of an interior of the cooler and the ambient temperature.

6. The cooler of claim 1, wherein the cooling control unit is to:

monitor an internal temperature of the cooler; and when the power management technique is active, in response to the internal temperature raising above a temperature threshold, send a warning message to the vehicle.

7. The cooler of claim 1, wherein the cooling control unit is to:

monitor a surface temperature of an item inside the cooler;

in response to determine that the surface temperature of the item is outside a safe temperature range for a threshold period of time, send a warning message to the vehicle.

8. The cooler of claim 1, wherein the cooling control unit is further to transmit a signal to the vehicle to lower power consumed by an HVAC system of the vehicle in response to the charge margin being below a threshold.

9. A cooler for a vehicle comprising:

an electric cooling unit;

a plurality of sensors;

a wireless node to communicatively couple to the vehicle; and a cooling control unit to:

monitor a charge margin of the vehicle; and in response to the charge margin being below a threshold, request the vehicle to increase a number of revolutions per minute of an engine of the vehicle.

10. The cooler of claim 9, wherein the cooling control unit requests the vehicle increase the number of revolutions per minute of the engine at a first time, and wherein the cooling control unit is to, at a second time after the first time, in response to the charge margin being lower at the second time than the charge margin at the first time, send a warning message to the vehicle, the warning message to include suggestions of actions to reduce power consumption of other subsystems of the vehicle.

11. A cooler for a vehicle comprising:

an electric cooling unit;

a plurality of sensors;

a wireless node to communicatively couple to the vehicle; and a cooling control unit to:

monitor a charge margin of the vehicle; and responsive to the charge margin being below a threshold, repeatedly turn the electric cooling unit off for a first time period and on for a second time period, the first time period longer than the second time period.

12. A cooler for a vehicle comprising:

an electric cooling unit;

a plurality of sensors;

a wireless node to communicatively couple to the vehicle; and a cooling control unit to:

monitor a charge margin of the vehicle; and in response to the charge margin being below a threshold, activate a power management technique, wherein the cooling control unit is to receive a temperature set point from the vehicle;

determine a temperature difference between an ambient temperature around the cooler and the temperature set point;

determine, based on the temperature difference, whether the cooling unit has a capacity to cool the interior of the cooler to the temperature set point; and in response to determining that the cooling unit does not have the capacity to cool the interior of the cooler to the temperature set point, send an error warning message to the vehicle.

* * * * *